United States Patent
Okubo et al.

(10) Patent No.: US 9,963,097 B2
(45) Date of Patent: May 8, 2018

(54) WEBBING DEVICE

(71) Applicant: KABUSHIKI KAISHA TOKAI-RIKA-DENKI-SEISAKUSHO, Aichi (JP)

(72) Inventors: Shinichi Okubo, Aichi (JP); Masaru Ukita, Aichi (JP); Tomonari Umakoshi, Aichi (JP); Haruhiko Hashimoto, Aichi (JP); Ryu Nakashima, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 11 days.

(21) Appl. No.: 15/314,074

(22) PCT Filed: Apr. 30, 2015

(86) PCT No.: PCT/JP2015/063022
§ 371 (c)(1),
(2) Date: Nov. 26, 2016

(87) PCT Pub. No.: WO2015/186458
PCT Pub. Date: Dec. 10, 2015

(65) Prior Publication Data
US 2017/0197576 A1    Jul. 13, 2017

(30) Foreign Application Priority Data

Jun. 3, 2014 (JP) ................................ 2014-115153

(51) Int. Cl.
*B60R 21/18* (2006.01)
*B60R 22/14* (2006.01)
*B60R 22/18* (2006.01)
*B60R 22/36* (2006.01)

(52) U.S. Cl.
CPC .............. *B60R 21/18* (2013.01); *B60R 22/14* (2013.01); *B60R 22/18* (2013.01); *B60R 22/36* (2013.01)

(58) Field of Classification Search
CPC ...................................................... B60R 21/18
USPC ....................................................... 280/733
See application file for complete search history.

(56) References Cited

U.S. PATENT DOCUMENTS

| | | | |
|---|---|---|---|
| 6,109,647 A * | 8/2000 | Akaba ..................... | B60R 21/18 280/733 |
| 2002/0130498 A1* | 9/2002 | Kurata .................... | B60R 21/18 280/733 |
| 2004/0164532 A1* | 8/2004 | Heidorn ................ | B60R 21/201 280/733 |
| 2007/0001435 A1* | 1/2007 | Gray ...................... | B60R 21/18 280/733 |

(Continued)

*Primary Examiner* — Toan To
(74) *Attorney, Agent, or Firm* — Roberts Mlotkowski Safran Cole & Calderon P.C.

(57) ABSTRACT

In a seatbelt device, at a time of an emergency of a vehicle, gas is supplied via a tube interior into a chest bag, and the chest bag is inflated and expanded. Here, the tube is disposed at a thickness direction one side of a webbing at positions at which a lap webbing, at a thickness direction other side thereof, is interfered with by a seat cushion and a passenger. Therefore, the tube being crushed by the seat cushion and the passenger, and the lap webbing, can be suppressed, and supplying of gas via the tube interior into the chest bag being limited can be suppressed.

6 Claims, 5 Drawing Sheets

(56) References Cited

U.S. PATENT DOCUMENTS

| | | | |
|---|---|---|---|
| 2007/0102909 A1* | 5/2007 | Nezaki | B60R 21/18 280/733 |
| 2007/0102910 A1* | 5/2007 | Nezaki | B60R 21/18 280/733 |
| 2009/0033077 A1* | 2/2009 | Yamataki | B60R 21/18 280/733 |
| 2009/0051150 A1* | 2/2009 | Murakami | B60R 21/18 280/733 |
| 2012/0306185 A1* | 12/2012 | Kim, II | B60R 21/18 280/733 |
| 2012/0319386 A1* | 12/2012 | Bahr | B60R 21/268 280/733 |
| 2013/0134695 A1 | 5/2013 | Burczyk | |
| 2013/0313811 A1* | 11/2013 | Ichida | B60R 21/18 280/733 |
| 2014/0239622 A1* | 8/2014 | Yamataki | B60R 21/18 280/733 |
| 2014/0246845 A1* | 9/2014 | Johnson | B60R 21/18 280/733 |

\* cited by examiner

WEBBING DEVICE

CROSS-REFERENCE TO RELATED APPLICATIONS

The present application is a U.S. National Phase of PCT/JP2015/063022 filed on Apr. 30, 2015 claiming priority to Japanese Patent application No. 2014-115153 filed Jun. 3, 2014. The disclosure of the PCT Application is hereby incorporated by reference into the present Application.

TECHNICAL FIELD

The present invention relates to a webbing device in which a bag body is provided at a webbing that is applied to a passenger of a vehicle.

BACKGROUND ART

In the vehicle safety belt of U.S. Patent Application Publication No. 2013/0134695, gas is supplied into a tube, the gas that has been supplied into the tube is supplied into a belt webbing, and the belt webbing is inflated.

Here, in this vehicle safety belt, the tube is provided within the belt webbing. Therefore, there is the possibility that, due to the tube being crushed together with the belt webbing at the position at which one side portion of the vehicle seat interferes with the belt webbing, the supplying of the gas from the tube interior into the belt webbing will be limited.

SUMMARY OF INVENTION

Technical Problem

In view of the above-described circumstances, an object of the present invention is to provide a webbing device that can suppress limiting of the supplying of a fluid from a supplying portion interior into a bag body.

Solution to Problem

A webbing device of a first aspect of the present invention comprises: a webbing that is applied to a passenger in a state in which, at one side in a thickness direction of the webbing, the webbing is interfered with by one side portion of at least one of a seat of a vehicle or the passenger seated in the seat; a supporting member that is disposed at a side of another side portion of the seat, and that supports another side in the thickness direction of the webbing; a supplying portion that is disposed at the other side of the webbing at a position at which the one side portion of the at least one of the seat or the passenger interferes with the webbing, and that is disposed at the one side of the webbing at a supporting position at which the webbing is supported by the supporting member, a fluid being supplied to an interior of the supplying portion; and a bag body that is provided at the webbing, and that has an interior to which fluid, that has been supplied to the interior of the supplying portion, is supplied, and that is inflated.

In a webbing device of a second aspect of the present invention, in the webbing device of the first aspect of the present invention, the bag body is provided at the one side and the other side of the webbing, and the supplying portion is provided at the bag body.

In a webbing device of a third aspect of the present invention, in the webbing device of the first aspect or the second aspect of the present invention, the supplying portion is separate from the bag body.

Advantageous Effects of Invention

In the webbing device of the first aspect of the present invention, the webbing is applied to the passenger in the state in which the webbing, at the one side in the thickness direction of the webbing, is interfered with by the one side portion of the at least one of the seat or the passenger who is seated in the seat. Moreover, the supporting member is disposed at the side of the other side portion of the seat, and supports the other side in the thickness direction of the webbing. Further, the fluid is supplied to the interior of the supplying portion, and the fluid that has been supplied to the interior of the supplying portion is supplied to the interior of the bag body, and the bag body is inflated.

Here, the supplying portion is disposed at the other side of the webbing, at the position at which the one side portion of the at least one of the seat or the passenger interferes with the webbing. Therefore, the supplying portion being crushed by the webbing and the one side portion of the at least one of the seat or the passenger can be suppressed, and the supply of the fluid from the interior of the supplying portion to the interior of the bag body being limited can be suppressed.

Moreover, the supplying portion is disposed at the one side of the webbing, at the supporting position at which the webbing is supported by the supporting member. Therefore, the supplying portion being crushed by the supporting member and the webbing can be suppressed, and the supply of the fluid from the interior of the supplying portion to the interior of the bag body being limited can be suppressed further.

In the webbing device of the second aspect of the present invention, the bag body is provided at the one side and the other side of the webbing, and the supplying portion is provided at the bag body. Therefore, the supplying portion can easily be placed at the other side of the webbing by, at the position at which the one side portion of the at least one of the seat or the passenger interferes with the webbing, providing the supplying portion at the bag body that is at the other side of the webbing.

In the webbing device of the third aspect of the present invention, the supplying portion is separate from the bag body. Therefore, at the position at which the one side portion of the at least one of the seat or the passenger interferes with the webbing, the supplying portion can be easily placed at the other side of the webbing.

DESCRIPTION OF EMBODIMENTS

Figure 1:
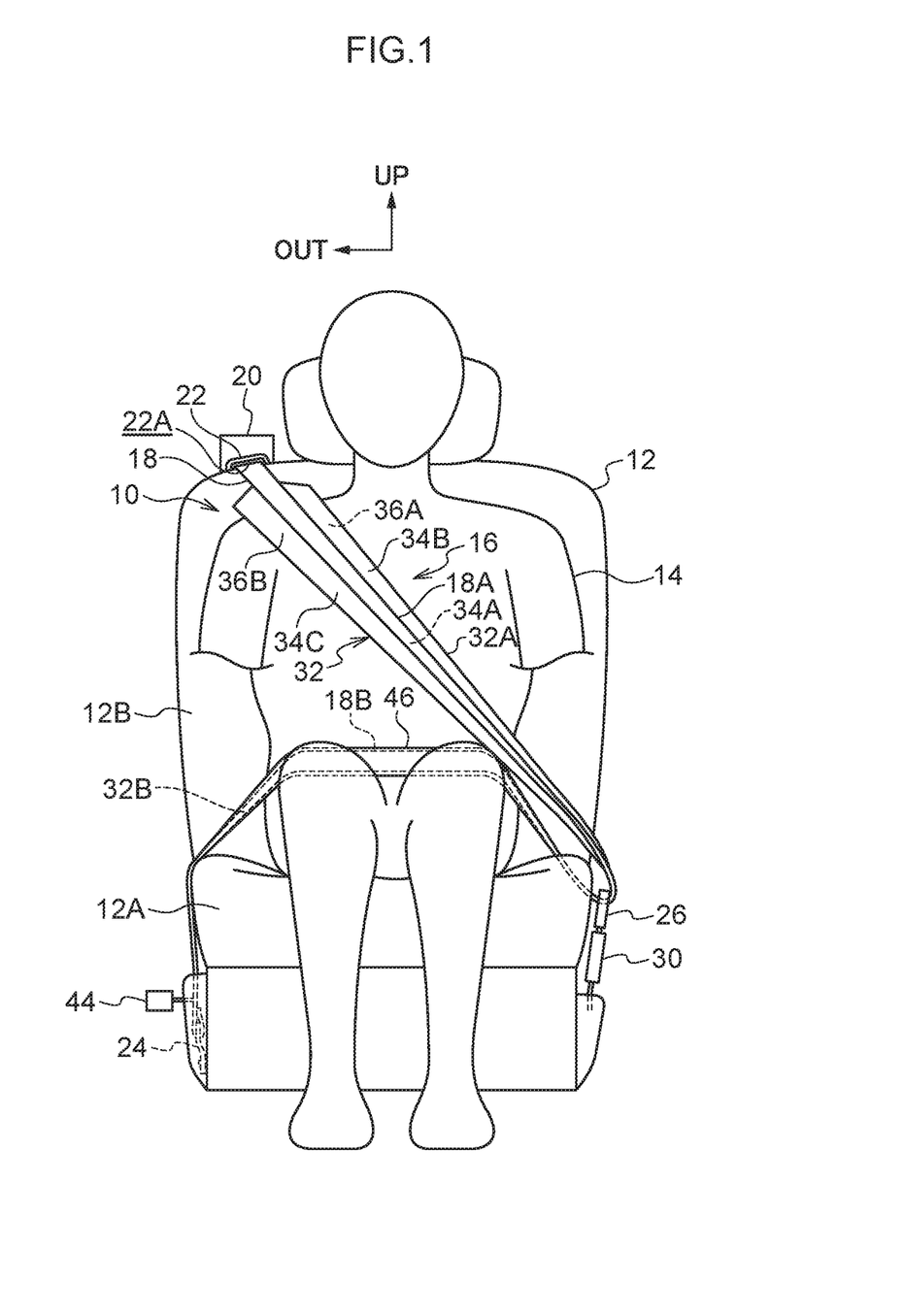
FIG. 1 is a front view showing a time of operation of an air belt of a seatbelt device relating to an embodiment of the present invention.

A seatbelt device 10, that relates to an embodiment and to which a webbing device of the present invention is applied, is shown in a front view in FIG. 1. Note that, in the drawings, the vehicle transverse direction outer side (the vehicle right side) is indicated by arrow OUT, and the upper side is indicated by arrow UP.

As shown in FIG. 1, the seatbelt device 10 relating to the present embodiment is provided at a seat 12 of a vehicle, and the front, the right and the top of the seat 12 are directed toward the front, the right and the top of the vehicle, respectively. A seat cushion 12A is provided at the lower portion of the seat 12, and a seatback 12B is provided at the rear portion of the seat 12. A passenger 14 of the vehicle can sit in the seat 12.

The seatbelt device 10 has an air belt 16 that is substantially shaped as an elongated strip and serves as a webbing body. A webbing 18 (a belt) that is shaped as an elongated strip is provided at the air belt 16 along the length direction thereof.

The webbing 18 is, from the length direction base end side thereof, taken-up and stored by a take-up device 20 that serves as a storage means. The take-up device 20 is fixed to the vehicle body (or the seat 12) at the vehicle rear side of the vehicle transverse direction outer side portion and the upper portion of the seat 12, and the webbing 18 is pulled-out toward the vehicle front side. A lock mechanism (not shown) is provided at the take-up device 20. At the time of an emergency of the vehicle (a predetermined occasion such as at the time of a collision (the time of sudden pulling-out of the webbing 18 from the take-up device 20 or the time of a rapid deceleration of the vehicle) or the like), the lock mechanism is operated, and pulling-out of the webbing 18 from the take-up device 20 is locked.

A shoulder anchor 22 that serves as an upper supporting portion is fixed to the vehicle body (or the seat 12) at the vehicle rear side of the vehicle transverse direction outer side portion and the upper portion of the seat 12. An insert-through hole 22A that is shaped as an elongated rectangle is formed so as to pass-through the shoulder anchor 22. The portion, that is further toward the length direction distal end side than the take-up device 20, of the webbing 18, is inserted-through the insert-through hole 22A of the shoulder anchor 22 so as to be able to move in the length direction, and the webbing 18 is supported in a state of being, at a thickness direction one side thereof, folded-over at the lower side peripheral surface of the insert-through hole 22A of the shoulder anchor 22 (the peripheral surface at the passenger 14 side).

The length direction distal end of the webbing 18 is supported at an anchor 24 that serves as an outer supporting portion. The anchor 24 is fixed to the vehicle body (or the seat 12) at the vehicle transverse direction outer side and the lower side of the rear portion of the seat 12.

A tongue 26 (see FIG. 5) that serves as a supporting member (an attachment portion) is provided at the portion, that is between the shoulder anchor 22 and the anchor 24, of the webbing 18. An insert-through hole 28 that is shaped as an elongated rectangle is formed so as to pass-through the tongue 26, and the webbing 18 is inserted-through the insert-through hole 28 so as to be able to move in the length direction. Further, a buckle 30 that serves as an inner supporting portion is fixed to the vehicle body (or the seat 12) at the vehicle transverse direction inner side and the lower side of the rear portion of the seat 12.

Figure 5:
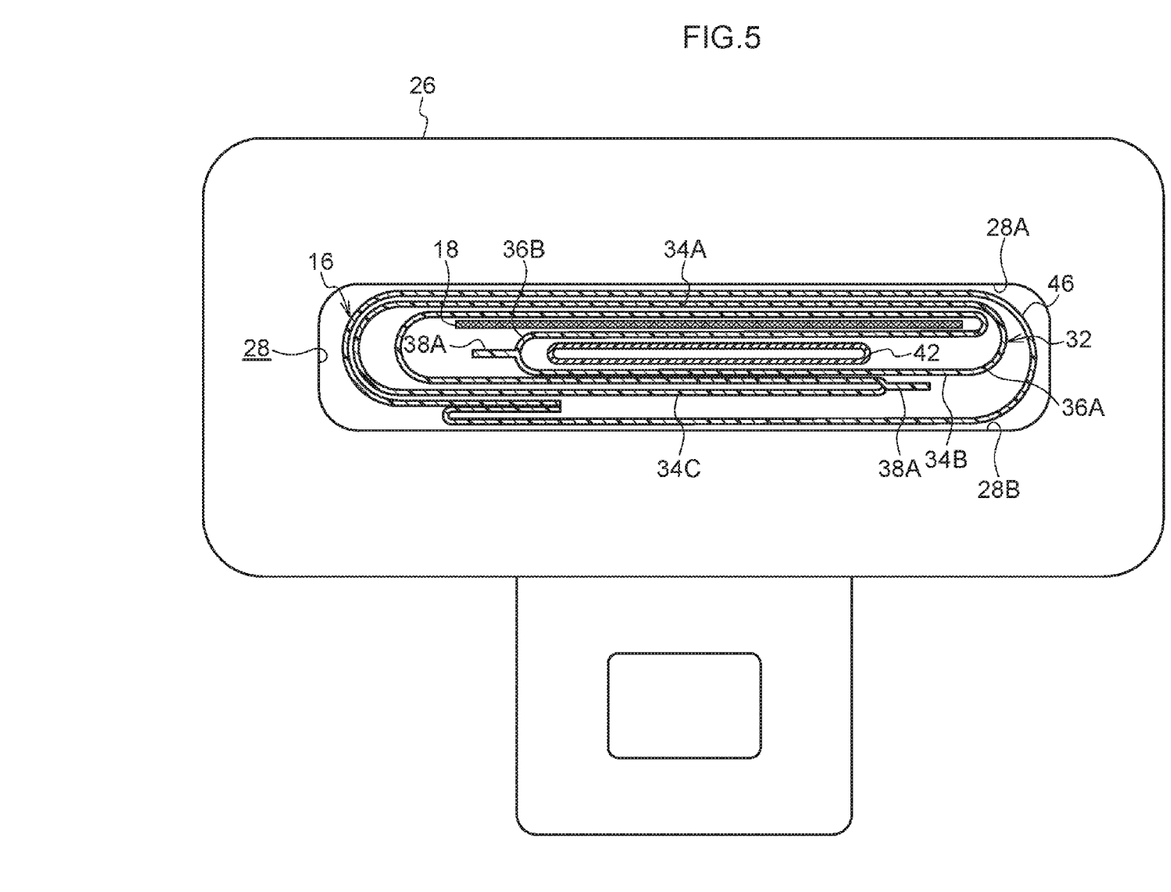
FIG. 5 is a cross-sectional view at a tongue position, that shows the air belt of the seatbelt device relating to the embodiment of the present invention.

The tongue 26 is made to be detachable with respect to the buckle 30. Due to the webbing 18 being pulled-out from the take-up device 20 and the tongue 26 being attached to the buckle 30, the webbing 18 is applied from the front side to the passenger 14 who is seated in the seat 12. Due thereto, due to the webbing 18 being supported in a state of, at the thickness direction one side thereof, being folded-over at an upper side peripheral surface 28A (the peripheral surface at the passenger 14 side, the one side peripheral surface) of the insert-through hole 28 of the tongue 26, the portion, that is between the shoulder anchor 22 and the tongue 26 (the portion at one side of the tongue 26), of the webbing 18 is a shoulder webbing 18A (a shoulder belt) and is applied in an oblique direction to the shoulder portion and the chest portion and the like of the passenger 14, and the portion, that is between the tongue 26 and the anchor 24 (the portion at the other side of the tongue 26), of the webbing 18 is a lap webbing 18B (a lap belt) and is applied in the lateral direction to the waist region of the passenger 14. Further, at the thickness direction other side thereof, the webbing 18 is apart from a lower side peripheral surface 28B (the peripheral surface at the side opposite the passenger 14, the other side peripheral surface) of the insert-through hole 28 of the tongue 26. Moreover, at the thickness direction other side thereof, the lap webbing 18B is interfered with by and is bent at the corner portion, that is at the vehicle transverse direction outer side and the upper side, of the seat cushion 12A of the seat 12, and, at the thickness direction other side thereof, the lap webbing 18B is interfered with by and is bent at the vehicle transverse direction outer side end portion of the waist region of the passenger 14 (the portion where the lap webbing 18B is first interfered with by the passenger 14 at the anchor 24 side).

As shown in FIG. 1 and FIG. 3 through FIG. 5, a bag 32, that is shaped as an elongated bag and serves as a bag body, is provided at the air belt 16 along the length direction thereof. The bag 32 is disposed at the range from the shoulder webbing 18A to the lap webbing 18B of the webbing 18, and, together with the webbing 18, is inserted-through the insert-through hole 28 of the tongue 26 so as to be able to move in the length direction. The portion, that is at the position of the shoulder webbing 18A, of the bag 32 is a chest bag 32A (a first bag) that serves as one side portion (an inflating portion), and the portion, that is at the position of the lap webbing 18B, of the bag 32 is a waist bag 32B (a second bag) that serves as the other side portion (a placed portion).

Figure 3:
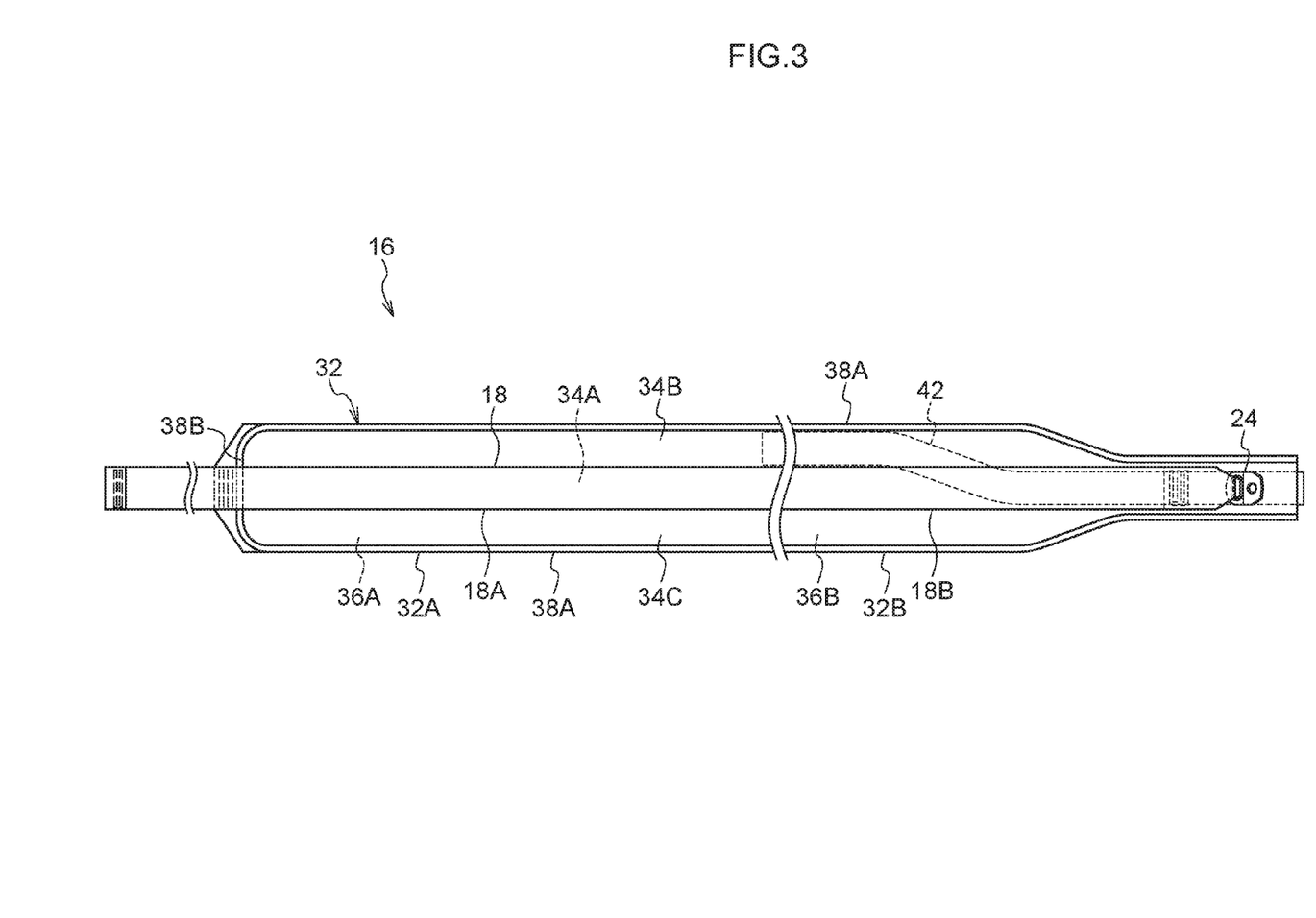
FIG. 3 is an expanded plan view showing main portions of the air belt of the seatbelt device relating to the embodiment of the present invention.
Figure 4:
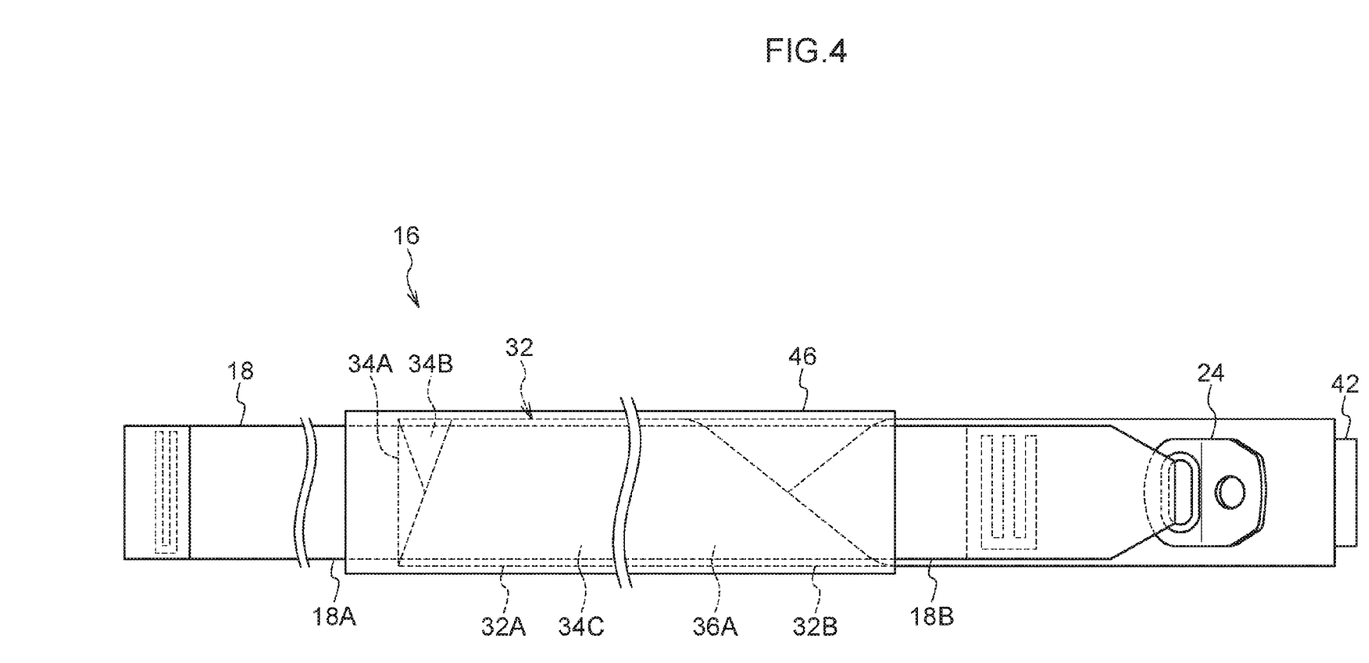
FIG. 4 is a plan view showing the air belt of the seatbelt device relating to the embodiment of the present invention.

The bag 32 is a shape that is symmetrical with respect to a transverse direction central line thereof, and the transverse direction central line of the bag 32 is disposed along the transverse direction central line of the webbing 18. The transverse direction dimension of the bag 32 is larger than the transverse direction dimension of the webbing 18. A transverse direction central portion 34A (a facing portion) of the bag 32 faces the webbing 18 in the thickness direction of the webbing 18. A transverse direction one side portion 34B (inner side portion, upper side portion) and a transverse direction other side portion 34C (outer side portion, lower side portion) of the bag 32 extend-out toward the transverse direction outer sides of the webbing 18.

The transverse direction central portion 34A of the bag 32 is disposed at the thickness direction one side of the webbing 18, and the transverse direction central portion 34A of the bag 32 is disposed between the webbing 18 and the upper side peripheral surface 28A of the insert-through hole 28 of the tongue 26. The transverse direction one side portion 34B, other than at the anchor 24 peripheral portion, of the bag 32 is folded-onto the thickness direction other side of the webbing 18. The transverse direction one side portion 34B of the bag 32 is disposed between the webbing 18 and the lower side peripheral surface 28B of the insert-through hole 28 of the tongue 26. The transverse direction other side portion 34C, other than at the anchor 24 peripheral portion, of the bag 32 is folded-onto the thickness direction other side of the webbing 18 at the side of the transverse direction one side portion 34B of the bag 32 that is opposite the webbing 18. The transverse direction other side portion 34C of the bag 32 is disposed between the transverse direction one side portion 34B of the bag 32 and the lower side peripheral surface 28B of the insert-through hole 28 of the tongue 26. At the time when the webbing 18 is applied to the passenger 14, due to the bag 32 being supported, together with the webbing 18, in a state of being folded-over at the upper side peripheral surface 28A of the insert-through hole 28 of the tongue 26, the transverse direction central portion 34A of the bag 32 is disposed at the passenger 14 side of the webbing 18 at the chest bag 32A, and is disposed at the side opposite the passenger 14 of the webbing 18 at the waist bag 32B.

The bag 32 is formed in the shape of a bag by so-called hollow weaving. An obverse layer 36A, that is shaped as an elongated strip and serves as a first layer at the side opposite the webbing 18, and a reverse layer 36B, that is shaped as an elongated strip and serves as a second layer at the webbing 18 side, are provided at the bag 32. Side joining portions 38A and an end joining portion 38B are formed at entire of the transverse direction both ends and the vicinity of the length direction base end portion (the end portion at the length direction base end side of the webbing 18) of the bag 32, respectively. The side joining portions 38A and the end joining portion 38B are formed by so-called single-layer fabrics, and the obverse layer 36A and the reverse layer 36B are joined together (are made integral). Due thereto, the interior (between the obverse layer 36A and the reverse layer 36B) of the bag 32 is open at the length direction distal end (the end at the length direction distal end side of the webbing 18). Further, the bag 32 is joined to the webbing 18 by sewing or adhesion or the like at appropriate positions.

A tube 42 that is tubular and serves as a supplying portion is provided at the air belt 16 along the length direction. The tube 42 is structured of a fabric, and is flexible. The tube 42 is inserted into the bag 32 from the length direction distal end (the open end) of the bag 32, and the length direction distal end (the end at the length direction distal end side of the webbing 18) of the tube 42 extends-out from the length direction distal end of the bag 32. At the anchor 24 side portion, the tube 42 is disposed within the transverse direction central portion 34A of the bag 32, and, at the portion other than the anchor 24 side portion, the tube 42 is disposed within the transverse direction one side portion 34B of the bag 32. Between the portion that is disposed within the transverse direction central portion 34A of the bag 32 and the portion that is disposed within the transverse direction one side portion 34B of the bag 32, the tube 42 is disposed in a state of being tilted. The length direction base end portion of the tube 42 (the end portion at the length direction base end side of the webbing 18) is, together with the webbing 18 and the bag 32, inserted-through the insert-through hole 28 of the tongue 26 so as to be able to move in the length direction. The length direction base end of the tube 42 is disposed within the chest bag 32A.

Figure 2:
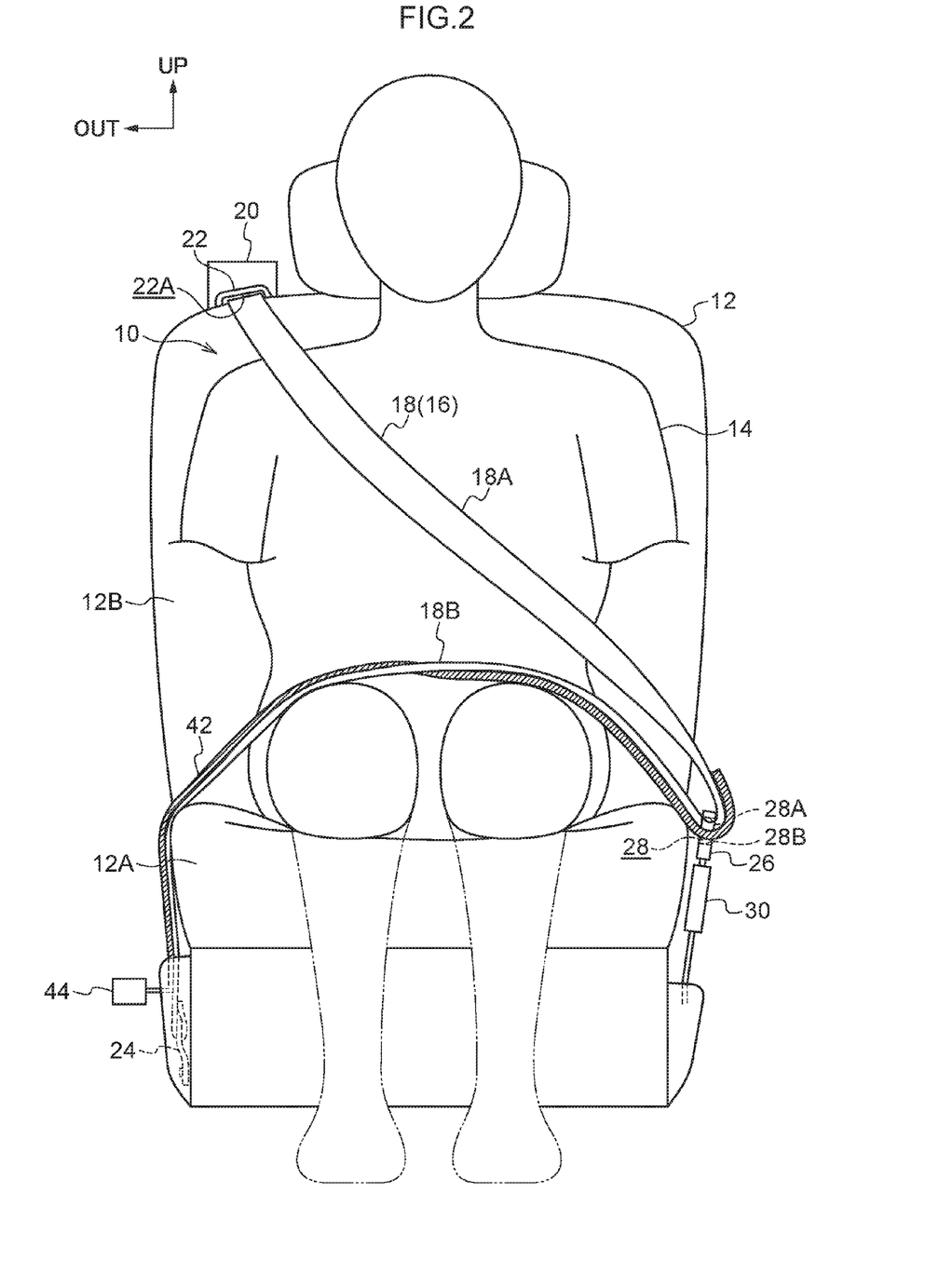
FIG. 2 is a front view showing the placement of a webbing and a tube of the air belt of the seatbelt device relating to the embodiment of the present invention.

At the positions at which the lap webbing 18B of the webbing 18, at the thickness direction other side thereof, is interfered with by the corner portion that is at the vehicle transverse direction outer side and the upper side of the seat cushion 12A of the seat 12, and by the vehicle transverse direction outer side end portion of the waist region of the passenger 14, the tube 42 is disposed within the transverse direction central portion 34A of the bag 32, and is disposed at the thickness direction one side of the webbing 18 (the side of the webbing 18 that is opposite the seat cushion 12A) (see FIG. 2). Further, at the position at which the tube 42 is inserted-through the insert-through hole 28 of the tongue 26, the tube 42 is disposed within the transverse direction one side portion 34B of the bag 32, and is disposed at the thickness direction other side of the webbing 18 (the side of the webbing 18 that is opposite the upper side peripheral surface 28A of the insert-through hole 28) (see FIG. 2 and FIG. 5).

An inflator 44 (see FIG. 1 and FIG. 2) that serves as a supplying means communicates with the interior of the length direction distal end of the tube 42. Due to the inflator 44 instantaneously generating high-pressure gas that serves as a fluid and supplying the gas to the tube 42 interior at the time of an emergency of the vehicle (a predetermined occasion such as a time of sensing of a collision, or the like), the gas is supplied via the tube 42 interior into the chest bag 32A of the bag 32, and the chest bag 32A is inflated by the gas.

A cover 46 that is tubular and serves as a covering member is provided at the air belt 16 along the length direction thereof. The cover 46 is flexible. The cover 46 covers (accommodates) the portion, that is other than at the anchor 24 periphery, of the bag 32. The cover 46, together with the webbing 18, the bag 32 and the tube 42, is inserted-through the insert-through hole 28 of the tongue 26 so as to be able to move in the length direction. Further, due to the chest bag 32A being inflated as described above, the cover 46 is ruptured at the position corresponding to the chest bag 32A, and the chest bag 32A is expanded.

Operation of the present embodiment is described next.

In the seatbelt device 10 of the above-described structure, due to the webbing 18 being pulled-out from the take-up device 20 and the tongue 26 being attached to the buckle 30, the webbing 18 is applied from the front side to the passenger 14 who is seated in the seat 12, and the shoulder webbing 18A of the webbing 18 is applied in an oblique direction to the shoulder portion and the chest portion and the like of the passenger 14, and the lap webbing 18B of the webbing 18 is applied in the lateral direction to the waist region of the passenger 14. Further, at the thickness direction one side thereof, the webbing 18 is supported at the upper side peripheral surface 28A of the insert-through hole 28, and, at the thickness direction other side thereof, the lap webbing 18B is interfered with by the corner portion, that is at the vehicle transverse direction outer side and the upper side of the seat cushion 12A of the seat 12, and by the vehicle transverse direction outer side end portion of the waist region of the passenger 14.

At the time of an emergency of the vehicle (the time of a collision or the like), the lock mechanism of the take-up device 20 is operated, and pulling-out of the webbing 18 from the take-up device 20 is locked. Therefore, the shoulder webbing 18A of the webbing 18 restrains the shoulder portion and the chest portion and the like of the passenger 14, and the lap webbing 18B of the webbing 18 restrains the waist region of the passenger 14.

Further, at the time of an emergency of the vehicle (the time of sensing of a collision, or the like), due to the inflator 44 instantaneously generating high-pressure gas and supplying the gas to the interior of the tube 42, this gas is supplied from the length direction base end of the tube 42

(the end at the side opposite the inflator 44) to the interior of the chest bag 32A of the bag 32, and, due thereto, the chest bag 32A is, at the webbing 18 thickness direction one side (the passenger 14 side), inflated and expanded while the cover 46 is ruptured at a position corresponding to the chest bag 32A. Therefore, the shoulder portion and the chest portion and the like of the passenger 14 can be restrained by the chest bag 32A, and, due to the chest bag 32A being crushed by the load from the shoulder portion and the chest portion and the like of the passenger 14, the kinetic energy of the shoulder portion and the chest portion and the like of the passenger 14 can be absorbed, and the shoulder portion and the chest portion and the like of the passenger 14 can be protected.

Here, the tube 42 is disposed at the thickness direction one side of the webbing 18 (the side of the webbing 18 that is opposite the seat cushion 12A), at the positions at which the lap webbing 18B of the webbing 18, at the thickness direction other side thereof, is interfered with by the corner portion that is at the vehicle transverse direction outer side and the upper side of the seat cushion 12A of the seat 12, and by the vehicle transverse direction outer side end portion of the waist region of the passenger 14.

Therefore, the tube 42 being crushed by the corner portion, that is at the vehicle transverse direction outer side and the upper side of the seat cushion 12A, and by the lap webbing 18 can be suppressed, and the tube 42 being crushed by the vehicle transverse direction outer side end portion of the waist region of the passenger 14 and by the lap webbing 18B can be suppressed, and the supply of gas from the inflator 44 via the tube 42 interior into the chest bag 32A being limited can be suppressed. Due thereto, the chest bag 32A can be inflated effectively, and the shoulder portion and the chest portion and the like of the passenger 14 can be protected effectively. Moreover, the pressure of the gas within the tube 42 becoming high can be suppressed, and the need to make the strength of the tube 42 high can be eliminated.

Moreover, the tube 42 being inflated by the gas 44 from the inflator can be suppressed, between the lap webbing 18B and the corner portion at the vehicle transverse direction outer side and the upper side of the seat cushion 12A, and between the lap webbing 18B and the vehicle transverse direction outer side end portion of the waist region of the passenger 14. Due thereto, the positions at which the lap webbing 18B is interfered with by the seat cushion 12A and by the waist region of the passenger 14 can be stabilized, and the waist region of the passenger 14 can be restrained effectively by the lap webbing 18B.

Further, at the position at which the tube 42 is inserted-through the insert-through hole 28 of the tongue 26, the tube 42 is disposed at the thickness direction other side of the webbing 18 (the side, that is opposite the upper side peripheral surface 28A of the insert-through hole 28, of the webbing 18). Therefore, even when load is applied from the passenger 14 to the webbing 18 at the time of an emergency of the vehicle, and moving force toward the upper side peripheral surface 28A side of the insert-through hole 28 is applied to the webbing 18, the tube 42 being crushed by the upper side peripheral surface 28A of the insert-through hole 28 and the webbing 18 can be suppressed, and the supply of the gas from the inflator 44 via the tube 42 interior into the chest bag 32A being limited can be suppressed more. Due thereto, the chest bag 32A can be inflated more effectively, and the shoulder portion and the chest portion and the like of the passenger 14 can be protected more effectively. Moreover, the pressure of the gas within the tube 42 becoming high can be suppressed more, and the need to make the strength of the tube 42 high can be eliminated more.

Moreover, the transverse direction central portion 34A of the bag 32 is disposed at the thickness direction one side of the webbing 18, and the transverse direction one side portion 34B of the bag 32 is disposed at the thickness direction other side of the webbing 18. Furthermore, the bag 32 and the tube 42 are separated, and the tube 42 is inserted within the bag 32. Therefore, by changing the placed position of the tube 42 at the interior of the transverse direction central portion 34A and the interior of the transverse direction one side portion 34B of the bag 32, the tube 42 can easily be disposed at the thickness direction one side and at the thickness direction other side of the webbing 18.

Note that, in the present embodiment, the lap webbing 18B, at the thickness direction other side thereof, is interfered with by the corner portion that is at the vehicle transverse direction outer side and the upper side of the seat cushion 12A, and by the vehicle transverse direction outer side end portion of the waist region of the passenger 14. However, the lap webbing 18B, at the thickness direction other side thereof, may be interfered with by the corner portion that is at the vehicle transverse direction outer side and the upper side of the seat cushion 12A, or by the vehicle transverse direction outer side end portion of the waist region of the passenger 14. For example, at the thickness direction other side thereof, the lap webbing 18B may be interfered with by the vehicle transverse direction outer side end portion of the waist region of the passenger 14, without being interfered with by the corner portion that is at the vehicle transverse direction outer side and the upper side of the seat cushion 12A.

Moreover, in the present embodiment, the tube 42 is disposed at the thickness direction one side of the webbing 18, at the positions at which the lap webbing 18B, at the thickness direction other side thereof, is interfered with by the corner portion that is at the vehicle transverse direction outer side and the upper side of the seat cushion 12A, and by the vehicle transverse direction outer side end portion of the waist region of the passenger 14. However, the tube 42 may disposed at the thickness direction one side of the webbing 18, at the position at which the lap webbing 18B, at the thickness direction other side thereof, is interfered with by the corner portion that is at the vehicle transverse direction outer side and the upper side of the seat cushion 12A, or at the position at which the lap webbing 18B, at the thickness direction other side thereof, is interfered with by the vehicle transverse direction outer side end portion of the waist region of the passenger 14.

Further, in the present embodiment, the bag 32 (the transverse direction central portion 34A) is disposed at the thickness direction one side of the webbing 18, and the bag 32 is configured to inflate and expand at the thickness direction one side of the webbing 18. However, the bag 32 (e.g., the transverse direction central portion 34A) may be disposed at the thickness direction other side of the webbing 18, and the bag 32 may be configured to inflate and expand at the thickness direction other side of the webbing 18. Moreover, the bag 32 may be disposed at the interior (the thickness direction intermediate portion) of the webbing 18, and the bag 32 may be configured to inflate and expand at the interior (the thickness direction intermediate portion) of the webbing 18. Furthermore, the bag 32 may be disposed at the length direction intermediate portion of the webbing 18 (between the length direction base end side portion and the length direction distal end side portion of the webbing 18), and the bag 32 may be configured to inflate and expand at the length direction intermediate portion of the webbing 18 (between the length direction base end side portion and the length direction distal end side portion of the webbing 18).

Moreover, in the present embodiment, the tube 42 (the supplying portion) is disposed within the bag 32 (the bag body). However, the tube 42 (the supplying portion) may be disposed at the exterior of the bag 32 (the bag body). Moreover, the tube 42 may be formed at a portion of the bag 32, and the non-tube 42 portion of the bag 32 may be made to be the bag body, and the tube 42 portion of the bag 32 may be made to be the supplying portion.

Further, in the present embodiment, the tube 42 is inserted-through the insert-through hole 28 of the tongue 26 (the supporting member). However, the tube 42 may be inserted-through the insert-through hole 22A of the shoulder anchor 22 (the supporting member).

Moreover, in the present embodiment, the seat of the present invention is made to be the seat 12 that is set in a vehicle body. However, the seat of the present invention may be made to be a child seat (a Child Restraint System) that is set at the seat 12. In this case, operation and effects that are similar to those of the above-described embodiment can be achieved even if the webbing 18 is interfered with by one side portion of the child seat that generally is harder than the seat 12.

The disclosure of Japanese Patent Application No. 2014-115153 that was filed on Jun. 3, 2014 is, in its entirety, incorporated by reference into the present specification.

EXPLANATION OF REFERENCE NUMERALS

10 seatbelt device (webbing device)
12 seat
14 passenger
18 webbing
26 tongue (supporting member)
32 bag (bag body)
42 tube (supplying portion)

The invention claimed is:

1. A webbing device comprising:
   a webbing that is applied to a passenger in a state in which, at one side in a thickness direction of the webbing, the webbing is interfered with by one side portion of at least one of a seat of a vehicle or the passenger seated in the seat;
   a supporting member that is disposed at a side of another side portion of the seat or the passenger seated in the seat, and that supports another side in the thickness direction of the webbing;
   a supplying portion that is disposed at the other side of the webbing at a position at which the one side portion of the at least one of the seat or the passenger interferes with the webbing, and that is disposed at the one side of the webbing at a supporting position at which the webbing is supported by the supporting member, a fluid being supplied to an interior of the supplying portion; and
   a bag body that is provided at the webbing, and that has an interior to which fluid, that has been supplied to the interior of the supplying portion, is supplied, and that is inflated.

2. The webbing device of claim 1, wherein the bag body is provided at the one side and the other side of the webbing, and the supplying portion is provided at the bag body.

3. The webbing device of claim 1, wherein the supplying portion is separate from the bag body.

4. The webbing device of claim 2, wherein the supplying portion is separate from the bag body.

5. The webbing device of claim 1, wherein the webbing is a lap portion of the webbing, the supplying portion is disposed on the lap portion of the webbing, and wherein the webbing is interfered with by one side portion of at least one of a lower seat cushion of a vehicle or the lap of the passenger seated in the seat.

6. The webbing device of claim 5, wherein the one side of the lap portion of the webbing faces the one side portion of the at least one of the lower seat cushion or the lap of the passenger, and wherein the supplying portion, by being disposed on the other side of the lap portion of the webbing, avoids being crushed between the lap portion of the webbing and the one side portion of the at least one of the lower seat cushion or the lap of the passenger.

* * * * *